US006264728B1

United States Patent
Purvis

(10) Patent No.: US 6,264,728 B1
(45) Date of Patent: Jul. 24, 2001

(54) AERODYNAMIC CLEANING OF COTTON FIBERS

(76) Inventor: Todd R. Purvis, P.O. Box 420, Dallas, NC (US) 28034

( * ) Notice: Subject to any disclaimer, the term of this patent is extended or adjusted under 35 U.S.C. 154(b) by 0 days.

(21) Appl. No.: 09/439,604

(22) Filed: Nov. 12, 1999

Related U.S. Application Data

(60) Provisional application No. 60/121,889, filed on Nov. 12, 1998.

(51) Int. Cl.$^7$ .................................................. B01D 45/12
(52) U.S. Cl. .............................. 95/267; 95/268; 95/271; 55/337; 55/459.1; 55/460
(58) Field of Search ..................... 55/385.1, 337, 55/344, 418, 419, 459.1, 460; 95/267, 268, 271; 209/250, 137

(56) References Cited

U.S. PATENT DOCUMENTS

| | | | |
|---|---|---|---|
| 3,116,238 | * 12/1963 | Etten | 209/250 |
| 4,300,926 | * 11/1981 | Brooks | 209/250 |
| 4,484,843 | * 11/1984 | McGlinsky et al. | 55/344 |
| 4,900,345 | * 2/1990 | Jeune | 55/337 |
| 5,509,948 | * 4/1996 | Keller et al. | 95/268 |
| 5,641,339 | * 6/1997 | Johnson | 55/459.1 |
| 5,735,403 | * 4/1998 | Stiglianese | 55/459.1 |
| 5,972,215 | * 10/1999 | Kammel | 55/459.1 |
| 6,093,228 | * 7/2000 | Wang | 55/385.1 |

* cited by examiner

Primary Examiner—David A. Simmons
Assistant Examiner—Minh-Chau T. Pham
(74) Attorney, Agent, or Firm—Dougherty & Clements LLP

(57) ABSTRACT

An improved apparatus and method of operation for separating contamination material from an air stream flow of cotton fibers, the apparatus including a primary chamber having continuous walls, the primary chamber positionable within the air stream of cotton fibers and foreign matter. The chamber may be cylindrical with the continuous walls having a plurality of holes forming porous sides extending the length of the cylindrical chamber. A secondary enclosure is utilized, the secondary enclosure is located adjacent to the primary chamber and below the porous side walls, the secondary enclosure receives foreign matter separated from the air stream of cotton fibers. The air stream flow and cotton fibers are directed through the primary chamber, with foreign matter displaced through the pores formed in the walls of the primary chamber. The contamination particles are displaced into the secondary enclosure by the weight of the particles and the lack of air flow in the secondary enclosure, which allows the particles to settle into the secondary enclosure and then be removed. The invented apparatus and method of operation provides for separation of cotton fibers from foreign matter without application of a destructive force and without damaging of cotton fibers. The apparatus and method of operation is not complex nor expensive to manufacture, does not require a constantly moving separation device, and requires minimal maintenance by operating staff.

20 Claims, 2 Drawing Sheets

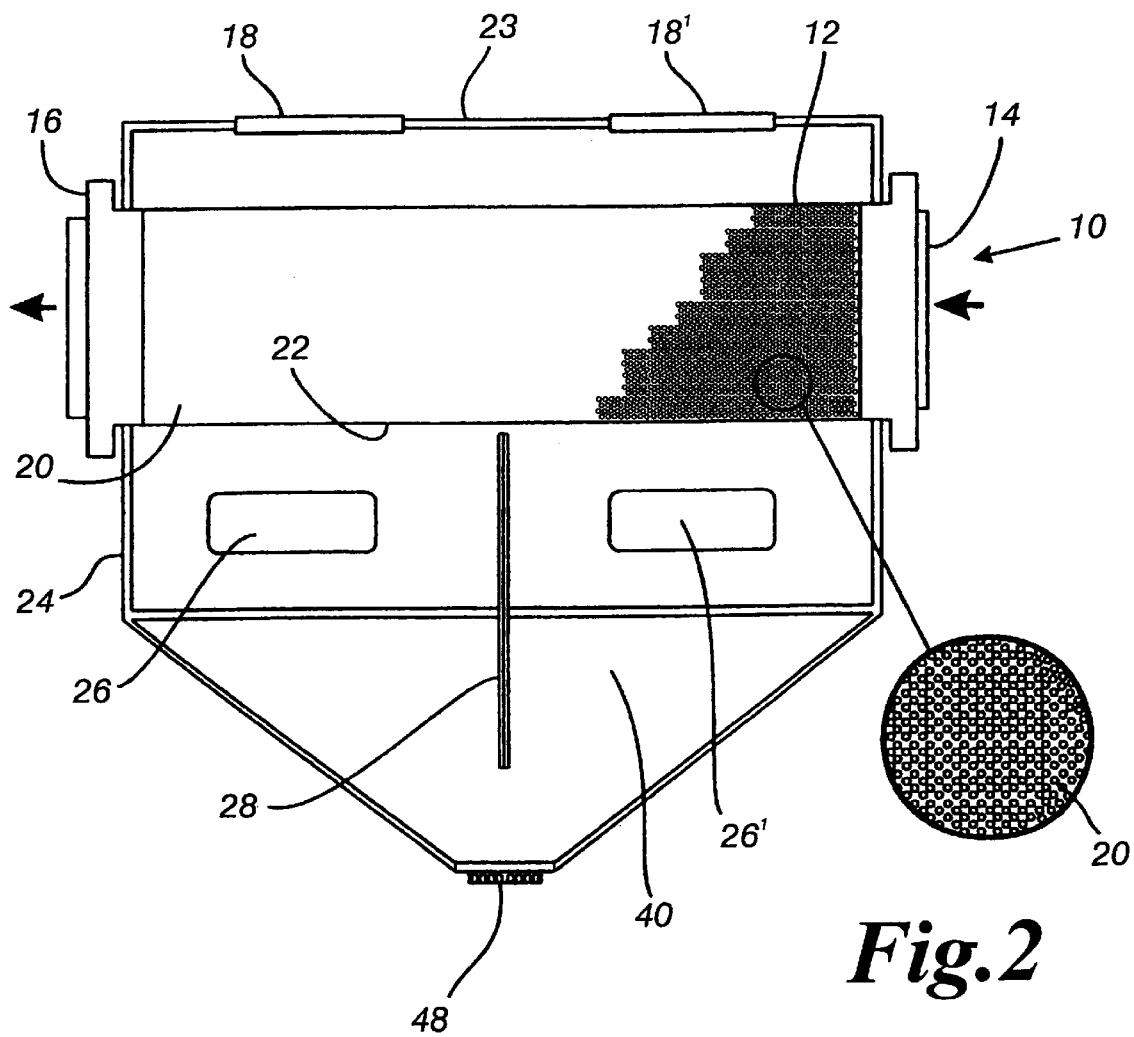

AERODYNAMIC CLEANING OF COTTON FIBERS

CROSS REFERENCE TO RELATED APPLICATION

This application claims the benefit of U.S. Provisional Application No. 60/121,889, filed on Nov. 12, 1998.

FIELD OF THE INVENTION

The present invention relates to an apparatus for and method of cleaning of foreign material from fibers, and more particularly to an apparatus and method of operation for separating foreign materials from cotton fibers within ductwork for movement of cotton fiber materials.

BACKGROUND OF THE INVENTION

In the cotton processing industry, raw cotton material is processed to remove foreign materials such as dust, stalks, stems, and other materials from the cotton fibers. As part of the processing, cotton fibers and associated foreign matter are transported through ductwork from one part of a processing facility to a finishing area of the processing facility. An efficient method and an apparatus are needed to remove most of the associated foreign matter from the cotton fibers during its pneumatic transport through ductwork, before the cotton fibers arrive at the finishing area of the processing facility.

Prior methods of removal of foreign matter include passing an air stream entrained with cotton fibers and foreign matter over or through a grid of bars, or directing such an air stream into a screen, rotating cylinder, or other obstacle, with the cotton fibers changing direction along with the air flow due to the lower density of the cotton fibers, and the foreign matter impacting the obstacle and being removed from the air stream due to the higher density of the foreign matter. A third prior method consists of directing cotton fiber and foreign matter between spiked rollers and a plate or grid of bars, with the spikes on the rollers contacting the cotton fibers, and forcing the cotton fibers to an exit while the higher density foreign matter is directed to a separate exit. All of the prior methods impose a force on the cotton fibers, with damage to the cotton fibers and some loss of cotton fibers from processing as the fibers are forced against a wall, grid of bars, or spikes.

The invented apparatus and method of operation provides for separation of cotton fibers from foreign matter without application of a destructive force and without damaging of cotton fibers. The invented apparatus and method of operation utilize an apparatus that does not require additional energy input to the flowing air stream within the facility's cotton fiber transport ductwork, therefore providing a cost-efficient apparatus and method to remove foreign matter from cotton fibers.

SUMMARY OF THE INVENTION

The invention provides an apparatus and a method of operation for separating contamination particles from an air stream of cotton fibers including a primary chamber having an inlet and an outlet, the primary chamber positionable within the air stream of cotton fibers, and a continuous wall of the primary chamber, the wall forming the sides and bottom of the primary chamber and having a plurality of holes. A secondary enclosure is utilized, the secondary enclosure is located adjacent to the primary chamber porous bottom and side walls, the secondary enclosure having an exit opening in the lower portion of the secondary enclosure. The primary chamber directs the air flow and cotton fibers through the primary chamber, with foreign matter displaced to and through the holes formed in the walls of the primary chamber. The secondary enclosure may have at least one partition or baffle that segregates the secondary enclosure into a low or no-flow air zone. The porous bottom of the primary chamber fits into the secondary enclosure walls, with the empty upper section of the secondary enclosure serving as a baffle for air flow within the primary chamber, drawing contamination particles heavier than cotton fibers into the secondary enclosure.

The primary chamber is aligned with a facility's existing ductwork, allowing the primary chamber to receive an air stream of cotton fibers and undesirable contamination particles flowing through the chamber. With the low, or no-flow, air space of the secondary enclosure underneath the porous walls of the lower wall of the primary chamber, air flow through the primary chamber may be slowed, allowing the heavier contamination particles to move through the porous walls of the primary chamber. The contamination particles are displaced into the secondary enclosure by the weight of the particles and the lack of air flow in the secondary enclosure, which allows the particles to settle further into the secondary enclosure. The air stream of cotton fibers, without foreign matter will continually move through the outlet of the primary chamber to a finishing area of the cotton processing facility.

The present invention is particularly useful for removing foreign matter from moving air streams of cotton fibers and foreign matter, with little if any additional energy requirements and minimal if any damage to cotton fibers moving through the apparatus. The method of operation is not complex nor expensive to manufacture, does not require a constantly moving separation device, and requires minimal maintenance by operating staff. The present invention may be used either as a single unit placed in the air flow or a series of units can be used.

OBJECTS OF THE INVENTION

The principal object of the present invention is to provide an improved apparatus for separation of foreign material from airstreams of cotton fibers.

Another object of this invention is to provide a method of removing foreign materials from airstreams of cotton fibers.

Another object of the invention is to provide an apparatus for removing foreign materials from airstreams of cotton fibers with a chamber that fits into existing ductwork of a cotton processing facility.

A further object of the invention is to provide an apparatus for removing foreign materials from airstreams of cotton fibers with a chamber that requires no significant additional energy input and minimal operator oversight.

BRIEF DESCRIPTION OF THE DRAWINGS

The foregoing and other objects will become more readily apparent by referring to the following detailed description and the appended drawings in which:

FIG. 1 is a cross-sectional view of the aerodynamic primary cleaning chamber of the present invention;

FIG. 2 is an enlarged view of a portion of the porous wall in the primary cleaning chamber shown in FIG. 1;

DETAILED DESCRIPTION

Figure 3:
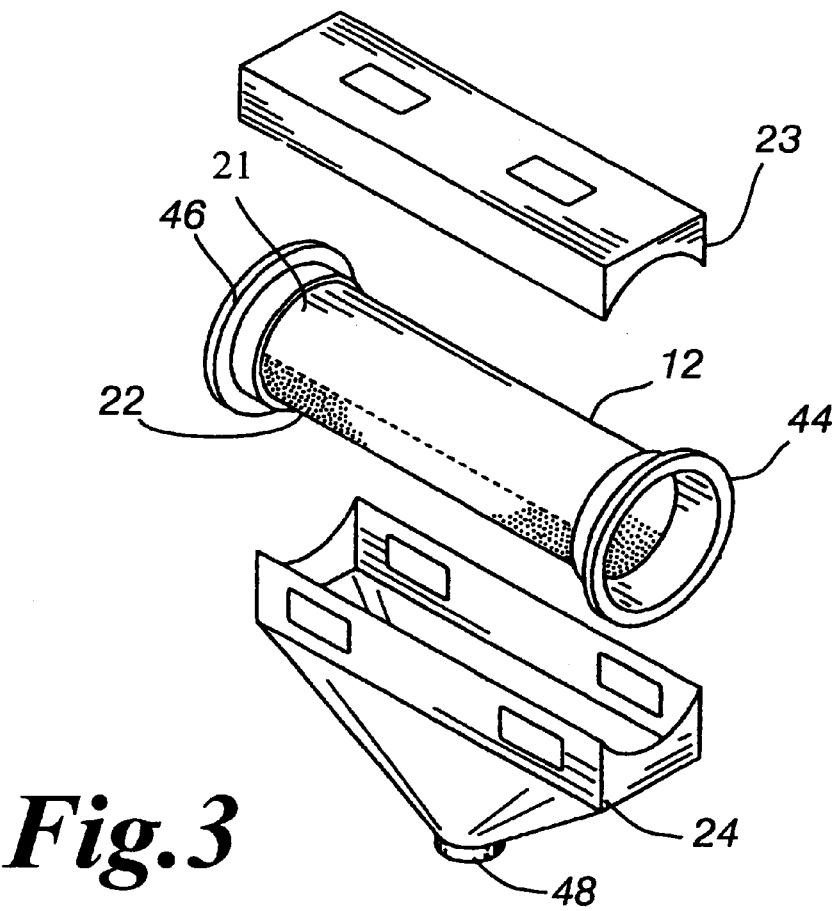
FIG. 3 is an isometric view of the primary chamber having a secondary enclosure underneath the chamber.

Referring now to the drawings, and particularly to FIG. 1, the invented aerodynamic cleaning apparatus 10 includes a primary chamber 12 which is tubular, having an inlet 14 and an outlet 16. The inlet 14 and outlet 16 are sized to fit a range of conduit widths that are utilized in cotton processing facilities. The primary chamber 12 may be cylindrical or it may have a rectangular, oval, or another cross-sectional shape that allows free flow of a stream of air having entrained therein cotton fibers and foreign material through the tubular chamber 12.

The primary chamber 12 serves as a primary cleaning conduit into which is introduced an air stream containing cotton fibers and foreign material. The primary chamber 12 has at least one upper covered access port 18, 18' to allow entry for cleaning of primary chamber 12. The primary chamber 12 has a continuous tubular wall 20, with a plurality of holes or perforations in the continuous wall 20. In a suitable arrangement, the holes are approximately 10 mm in diameter and approximately 9 mm apart throughout the wall 20 as shown in FIG. 2. A lower or bottom porous wall portion 22 of the wall 20 serves as the main receiving wall of the foreign matter that settles and separates from the air stream flow of cotton fibers through the primary chamber 12.

Referring to FIG. 3, a secondary cleaning enclosure 23, 24 is separated from the primary chamber 12 by the lower or bottom porous wall 22. The lower wall 22 has a porosity that allows foreign matter to fall freely through the holes. Advantageously, each hole may be approximately 10 mm in diameter, and spaced approximately 9 mm apart.

Within the lower secondary enclosure 24, a partition 28 serves as a control mechanism for slowing the flow of air through the lower secondary enclosure 24. The partition 28 creates a low flow zone 40 having a no-flow or minimal air stream flow. The lower secondary enclosure 24 may have at least one access port 26, 26' for cleaning of the lower secondary enclosure 24. The upper secondary enclosure 23 may have at least one access port 18, 18' for cleaning of the chamber 12.

The porous walls 20 of the primary chamber 12 preferably form a cylindrical conduit (FIGS. 3 and 4), or may form a four sided chamber with porous sides (not shown) if a square or rectangular tubular conduit is utilized (not shown). The inlet 14 of the primary chamber 12 has an inlet connector 44, preferably a twelve inch flange, adapted to fit a range of conduit sizes that are utilized in cotton processing facilities. Outlet 16 has an outlet connector 46 fitted around the outlet 16, preferably a twelve inch flange.

Figure 4:
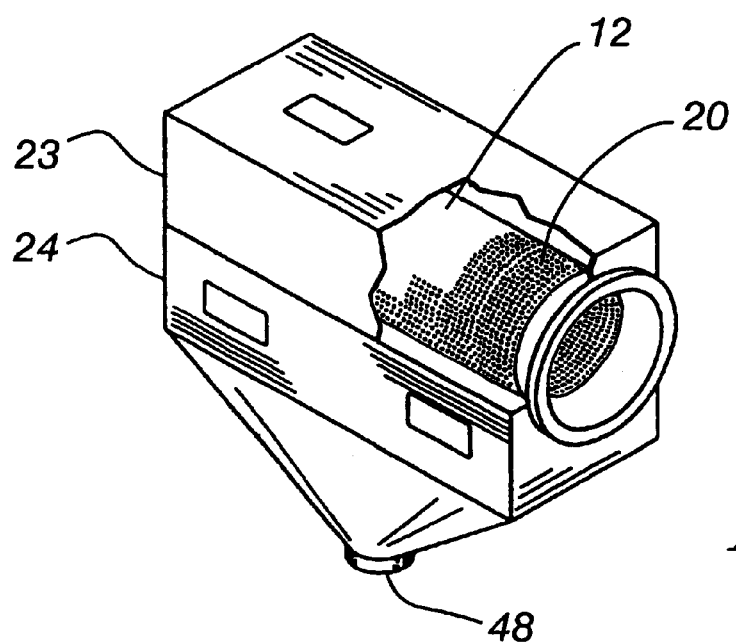
FIG. 4 is an isometric view of the primary chamber having a secondary enclosure around the chamber.

In operation, the primary chamber 12 may be fixed as by bolting into existing air stream flow ductwork at a cotton fiber processing facility at any appropriate area of ductwork, or in numerous areas of ductwork throughout the facility. As shown in FIGS. 3 and 4, the primary chamber 12 may have the secondary enclosure upper 23, and lower 24 portions located around the primary chamber 12 (FIG. 3), or the secondary enclosure may completely enclose chamber 12 (FIG. 4).

Foreign matter and contaminated particles separate out of the air stream because of the higher weight of the foreign matter and the slower air flow through the primary chamber 12 which is induced by the low air flow rate in the secondary enclosure 24, which is in direct communication with the porous wall 22 of the primary chamber 12. As air flow slows near the perimeter of porous wall 20, and lower wall 22 of the primary chamber 12, due to low or minimal air flow in the secondary lower enclosure 24, the foreign matter moves into the low or no-flow air area 40 of the lower enclosure 24. The foreign matter moves downward through the secondary enclosure 24 to a lower opening 48, for removal from enclosure 24 and disposal.

The aerodynamic cleaning apparatus 10 may be constructed of any material or composite that is lightweight and non-corrosive, including but not limited to: stainless steel, tin, sheet metal, lexan, ceramics, and plastics.

ALTERNATIVE EMBODIMENTS

In an alternative embodiment of FIG. 3, the lower enclosure 24 covers the lower curvature of the bottom wall 22. The upper wall surface 21 of the chamber 12 may be without holes, with only the lower half curvature of wall 22 having holes. Foreign matter will settle and separate from the continuous air stream flow of cotton fibers through the primary chamber 12, pass through holes in the lower wall 22, and pass through the no-flow air zone 40 of the secondary enclosure 24.

In the embodiment depicted in FIG. 4, the upper enclosure 23 and lower enclosure 24 enclose all of the porous continuous wall 20 and bottom wall 22. The enclosures 23, 24 receive foreign matter that passes through holes in the wall 20 and lower wall 22, with the foreign matter passing through the no-flow air zone 40 of the secondary enclosure 24.

SUMMARY OF THE ACHIEVEMENT OF THE OBJECTS OF THE INVENTION

From the foregoing, it is readily apparent that I have invented an improved apparatus and method of operation for improved separation of foreign material from airstreams of cotton fibers. The apparatus for separating foreign matter inserts into existing ductwork within cotton fiber processing facilities, and efficiently removes foreign materials from airstreams of cotton fibers without requiring significant additional energy input and with minimal operator oversight.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. An apparatus for separation of contamination particles from an air stream flow of cotton fibers comprising:

a primary chamber having an inlet for receiving a particulate laden air stream, an outlet, a body having a plurality of openings, connecting said inlet to said outlet and defining an unobstructed pathway therebetween such that a line segment from a center point of the inlet to a center point of the outlet is entirely disposed within said pathway; and a secondary chamber located adjacent to and below said primary chamber for receiving particulate passing through said openings and having an area of low air flow in relation to the air stream flow through said primary chamber, wherein said secondary chamber communicates with said primary chamber to reduce the air stream velocity in said primary chamber.

2. An apparatus according to claim 1 wherein said inlet, said body and said outlet communicate such that at least a portion the air stream can linearly pass therethrough unimpeded.

3. The apparatus according to claim 1 wherein said body has a uniform cross section.

4. The apparatus according to claim 3, wherein said body is cylindrical.

5. The apparatus according to claim 4, wherein said secondary enclosure is rectangular in shape, having a longitudinal axis substantially parallel to a central axis of said body.

6. The apparatus according to claim 4, wherein said secondary enclosure is trapezoidal in shape, having a longitudinal axis substantially parallel to a central axis of said body.

7. The apparatus according to claim 3, wherein said body is rectangular.

8. The apparatus according to claim 7, wherein said secondary enclosure is rectangular in shape, having a longitudinal axis substantially parallel to a central axis of said body.

9. The apparatus according to claim 7, wherein said secondary enclosure is trapezoidal in shape, having a longitudinal axis substantially parallel to a central axis of said body.

10. The apparatus according to claim 1 wherein said inlet, said outlet and said body have a common linear central axis.

11. The apparatus according to claim 10 wherein matter within the air stream flow can be transiently propelled, parallel to the common central axis, through the primary chamber.

12. The apparatus according to claim 1 wherein a top of said body does not have said openings.

13. The apparatus according to claim 1 wherein said openings are positioned throughout the entirety of said body.

14. The apparatus according to claim 1 wherein said openings have a diameter of about 10 mm and each of said openings is spaced about 9 mm apart from any adjacent opening.

15. The apparatus according to claim 1 wherein a baffle is disposed within said secondary chamber and divides said secondary chamber into at least two sections, and wherein said baffle obstructs the air stream flow through said secondary chamber.

16. The apparatus according to claim 15 wherein said baffle is non-perforated and the air stream flow can flow above and below said baffle.

17. The apparatus according to claim 16 wherein said baffle is substantially vertical.

18. The apparatus according to claim 1 wherein said inlet, said pathway and said outlet are adapted to allow cotton fibers to pass therethrough.

19. A method of separating contamination particles from an air stream flow of cotton fibers comprising the steps of:

(a) providing a primary chamber having an inlet, an outlet and a body having openings, connecting said inlet to said outlet and defining an unobstructed pathway therebetween such that a line segment from a center point of the inlet to a center point of the outlet is entirely disposed within said pathway;

(b) positioning a secondary chamber adjacent to and under said primary chamber, wherein said secondary chamber communicates with said primary chamber to reduce the air stream velocity in said primary chamber;

(c) directing the air stream, entrained with particulate, into said inlet;

(d) propelling some of the air flow from said inlet and through said outlet without passing through any of said openings;

(e) directing part of the air flow and particulate through said openings; and (f) receiving the particulate within said secondary chamber.

20. The method according to claim 19 wherein said secondary chamber includes a baffle disposed within said secondary chamber and said secondary chamber divides into at least two sections, and wherein said baffle obstructs the air stream flow through said secondary chamber, and wherein said openings have a diameter of about 10 mm and each of said openings is spaced about 9 mm apart from any adjacent opening.

* * * * *